(12) United States Patent
Jones et al.

(10) Patent No.: US 6,718,006 B2
(45) Date of Patent: Apr. 6, 2004

(54) FIBER-OPTIC ENCODING FOR DUAL TRANSMISSION MEASUREMENTS IN POSITRON EMISSION TOMOGRAPHY

(75) Inventors: William F. Jones, Knoxville, TN (US); Charles Watson, Knoxville, TN (US)

(73) Assignee: CTI Pet Systems, Inc., Knoxville, TN (US)

( * ) Notice: Subject to any disclaimer, the term of this patent is extended or adjusted under 35 U.S.C. 154(b) by 39 days.

(21) Appl. No.: 10/210,323

(22) Filed: Aug. 1, 2002

(65) Prior Publication Data

US 2003/0021375 A1 Jan. 30, 2003

Related U.S. Application Data

(63) Continuation-in-part of application No. 09/398,497, filed on Sep. 17, 1999, now Pat. No. 6,429,434, which is a continuation-in-part of application No. 09/070,951, filed on May 1, 1998, now Pat. No. 6,329,657.

(51) Int. Cl.[7] ................................................ G01N 23/06
(52) U.S. Cl. .................................... 378/51; 250/363.01
(58) Field of Search ....................... 378/51; 250/363.01, 250/363.04

(56) References Cited

U.S. PATENT DOCUMENTS

| | | |
|---|---|---|
| 4,743,764 A | 5/1988 | Casey et al. |
| 5,338,936 A | 8/1994 | Gullberg et al. |
| 5,359,198 A * | 10/1994 | Bourguignon et al. . 250/363.07 |
| 5,430,297 A | 7/1995 | Hawman |
| 5,434,416 A | 7/1995 | Motomura et al. |
| 5,471,061 A * | 11/1995 | Moyers et al. ......... 250/363.03 |
| 5,479,021 A | 12/1995 | Morgan et al. |
| 5,608,221 A | 3/1997 | Bertelsen et al. |
| 5,650,625 A | 7/1997 | Stoub |
| 6,040,580 A * | 3/2000 | Watson et al. ......... 250/363.03 |
| 6,072,177 A * | 6/2000 | McCroskey et al. ..... 250/252.1 |

OTHER PUBLICATIONS

Tan P. Bailey D.L., Meikle S.R., Eberl S. Fulton R.R., and Hutton B.F., "A Scanning Line Source for Simultaneous Emission and Transmission Measurements in SPECT," Journal of Nuclear Medicine, col. 34, No. 10, Oct. 1993.

Lange K., Carson R., "EM Reconstruction Algorithms for Emission and Transmission Tomography," Journal of Computer Assisted Tomography, vol. & No. 2, 1984.

Bailey D.L., Hutton B.F., Walker P.J., "Improved SPECT Using Simultaneous Emission and Transmission Tomography," Journal of Nuclear Medicine, vol. 28, No. 5, May 1987.

(List continued on next page.)

Primary Examiner—Craig E. Church
Assistant Examiner—Jurie Yun
(74) Attorney, Agent, or Firm—Pitts & Brittian, P.C.

(57) ABSTRACT

A coincidence transmission source serves to detect coincident activity from a radiation source. The coincidence transmission source includes a detector dedicated to collecting attenuation data. A collimated radiation source and a detector are positioned with respect to a tomography device such that only a selected strip of the imaging detector of the tomograph is illuminated such that events unrelated to the attenuation are eliminated. The coincidence transmission source includes a collimator in which is disposed a radiation source. Fiber optics are interconnected between a plurality of dedicated gamma radiation detectors and a plurality of photomultiplier tubes. The arrangement of fiber optics is designed such that the address of a particular gamma radiation detector is readily discernable while minimizing the number of PMT's required to process data accumulated by the gamma radiation detectors. In one embodiment, the attenuation point sources are disposed in a two-dimensional array to effectively minimize gamma crosstalk.

14 Claims, 9 Drawing Sheets

OTHER PUBLICATIONS

Lange K., Bahn M., Little R., "A Theoretical Study of Some Maximum Likelihood Algorithms for Emission and Transmission Tomography," IEEE Log No. 8714498, 1987.

Gullberg G.T., Huesman R.H., Malko R.A., Plec N.J., Budinger T.F., "An Attenuated Projector–Backprojector for Iterative SPECT Reconstruction," Physics in Medicine and Biology, vol. 30, No. 8, 799–816, 1985.

Chang L.T., "A Method for Attenuation Correction in Radionuclide Computed Tomography," IEEE Transactions for Nuclear Science, vol. NS–25, No. 1, Feb. 1978.

Hudson H.M., Larkin R.S., "Accelerated Image Reconstruction Using Ordered Subsets of Projection Data," IEEE Transactions on Medical Imaging, vol. 13, No. 4, Dec. 1994.

Hollinger D.F., Loncarie S., Yu D.C., Ali A., Chang W., "Using Fast Sequential Asymetric Fanbeam Transmission CT for Attenuation Correction of Cardiac SPECT Imaging," Journalof Nuclear Medicine, 1998; 39:1335–1344.

Kak, A.C., Slaney M., "Principles of Computerized Tomographic Imaging," IEEE Press 1987 ISBN 0–7803–1447–0.

Sorenson J.A., Phelps M.E., "Physics in Nuclear Medicine," Second Edition, Grune & Stratton, Inc. Harcourt, Brace Jovanovich, 1987, ISBN 0–8089–1804–4.

M.E. Phelps, et al.: "Positron Emission Tomography and Autoradiography, Principles and Applications for the Brain and Heart," Raven Press, 1986.

R.D. Evans: "The Atomic Nucleus," Kreiger, 1995.

J.C. Moyers: "A High Performance Detector Electronics System for Positron Emission Tomography," Masters Thesis, University of Tennessee, Knoxville, TN 1990.

R.A. de Kemp et al., in "Attenuation correction in PET using single photon transmission measurement," Masters Thesis, University of Tennessee, Knoxville, TN 1992.

S.R. Cherry, et al.: "3–D PET Using a Conventional Multislice Tomograph Without Septra," Jl. C.A.T., 15(4) 655–668.

J.S. Karp, et al.: "Singles Transmission in Volume–Imaging PET With a 137Cs Source," Phys. Med. Biol. vol. 40, 929–944 (1995).

S.K. Yu, et al.: Single–Photon Transmission Measurements in Positron Tomography Using 137Cs, Phys. Med. Biol. vol. 40, 1255–1266 (1995).

G.F. Knoll: Radiation Detection and Measurement, John Wiley & Sons (1989).

S.R. Cherry, et al.: "Optical Fiber Readout of Scintillator Arrays Using a Multi–Channel PMT: A High Resolution PET Detector for Animal Imaging," IEEE Transactions on Nuclear Science, vol. 43, No. 3, 1932–1937 (Jun., 1996).

J.A. McIntyre, et al.: "Construction of a Positron Emission Tomograph With 2.4 mm Detectors," IEEE Transactions on Nuclear Science, vol. 33, No. 1, 425–427 (Feb. 1986).

* cited by examiner

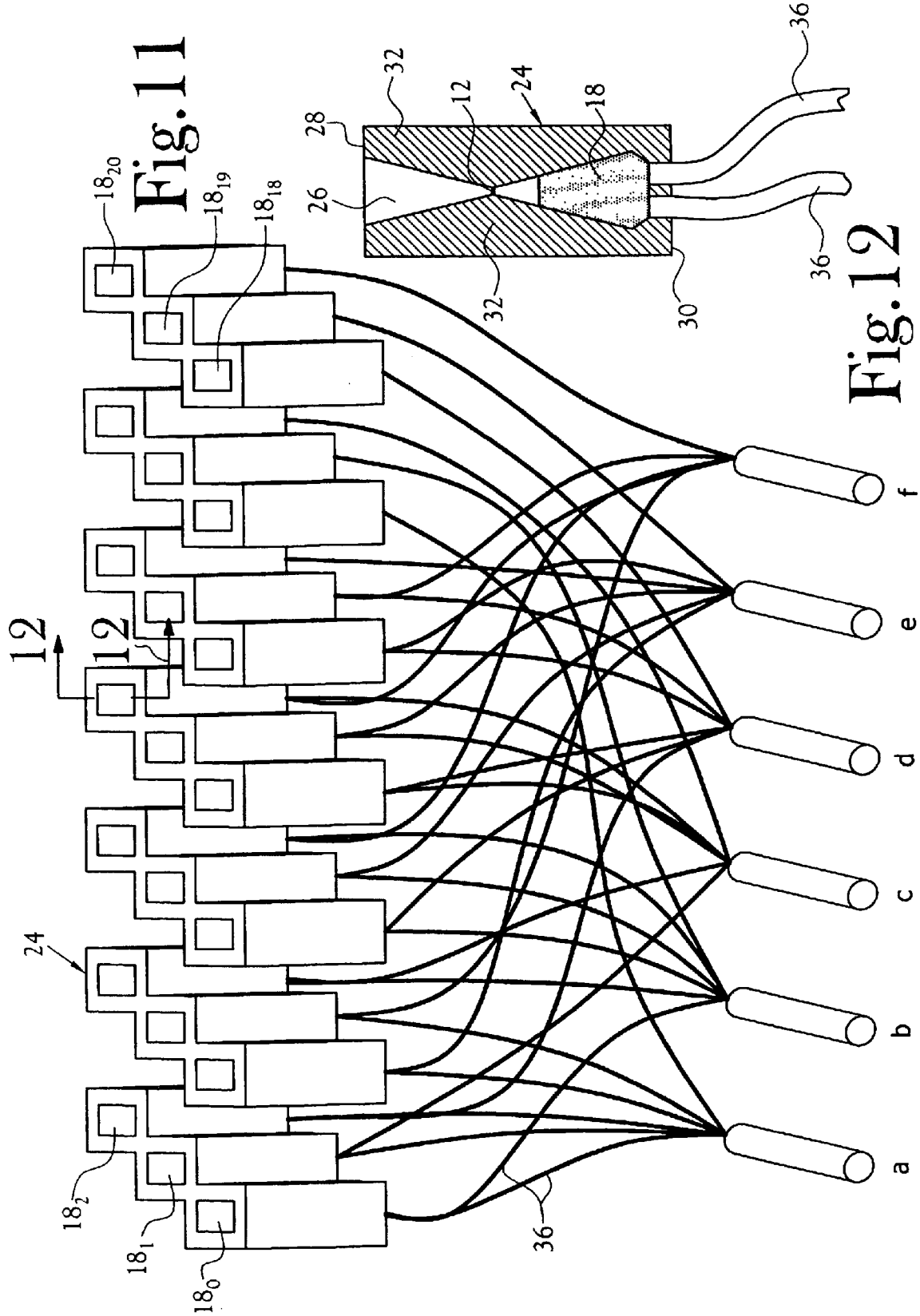

FIBER-OPTIC ENCODING FOR DUAL TRANSMISSION MEASUREMENTS IN POSITRON EMISSION TOMOGRAPHY

CROSS-REFERENCE TO RELATED APPLICATIONS

This application in part discloses and claims subject matter disclosed in our earlier filed pending application, Ser. No. 09/070,951, filed on May 1, 1998.

STATEMENT REGARDING FEDERALLY SPONSORED RESEARCH OR DEVELOPMENT

Not Applicable

BACKGROUND OF THE INVENTION

1. Field of Invention

This invention relates to the field of tomography. More specifically, the present invention relates to a method for fiber-optically encoding attenuation data associated with detecting coincidences using a collimated source and a dedicated detector for improved measurement sensitivity.

2. Description of the Related Art

Positron Emission Tomography (PET) has gained significant popularity in nuclear medicine because of the ability to non-invasively study physiological processes within the body. Applications employing the PET technology for its sensitivity and accuracy include those in the fields of oncology, cardiology and neurology.

Using compounds such as $^{11}$C-labeled glucose, $^{18}$F-labeled glucose, $^{13}$N-labeled ammonia and $^{15}$O-labeled water, PET can be used to study such physiological phenomena as blood flow, tissue viability, and in vivo brain neuron activity. Positrons emitted by these neutron deficient compounds interact with free electrons in the body area of interest, resulting in the annihilation of the positron. This annihilation yields the simultaneous emission of a pair of photons (gamma rays) approximately 180° (angular) apart. A compound having the desired physiological effect is administered to the patient, and the radiation resulting from annihilation is detected by a PET tomograph. After acquiring these annihilation "event pairs" for a period of time, the isotope distribution in a cross section of the body can be reconstructed.

PET data acquisition occurs by detection of both photons emitted from the annihilation of the positron in a coincidence scheme. Due to the approximate 180° angle of departure from the annihilation site, the location of the two detectors registering the "event" define a chord passing through the location of the annihilation. By histogramming these lines of response (the chords), a "sinogram" is produced that may be used by a process of back-projection to produce a three dimensional image of the activity. Detection of these lines of activity is performed by a coincidence detection scheme. A valid event line is registered if both photons of an annihilation are detected within a coincidence window of time. Coincidence detection methods ensure (disregarding other second-order effects) that an event line is histogrammed only if both photons originate from the same positron annihilation.

In the traditional (2-D) acquisition of a modern PET tomograph, a collimator (usually tungsten) known as a septa is placed between the object within the field-of-view and the discrete axial rings of detectors. This septa limits the axial angle at which a gamma ray can impinge on a detector, typically limiting the number of axial rings of detectors that a given detector in a specific ring can form a coincidence with to a few rings toward the front of the tomograph from the given detector's ring, the same ring that the detector is within, and a few rings toward the rear of the tomograph from the given detector's ring.

Attenuation was first measured in PET by using a ring of positron emitting isotope surrounding the object to be measured. In this technique, the ratio between a transmission scan and a blank scan form the attenuation. The blank is measured by simply measuring the rate that gamma rays from positrons are detected by the detection system when no attenuating media is present. In the original scanners as described above as having septa, the septa are provided for collimating the gamma rays in an axial direction, but the rings allow for no transaxial collimation. The lack of collimation allow the acceptance of scattered events into the transmission measurement, resulting in an underestimate of the attenuation. To improve the transmission measurement, systems use rotating rod sources. These sources are disposed in parallel fashion to the axis of the scanner and are collimated in the axial direction by the septa. In the transaxial direction, the collimation may be provided electronically since the position of the source is known. However, the activity in the rod must be the same as that activity in the earlier ring source to provide the same count rate. With modern block detectors, the dead-time of the near block limits the activity in the rod.

A more recent advancement in PET acquisition is 3-D, in which the septa are removed, which allows a given detector to be in coincidence with detectors from all other detector rings. With the advent of three-dimensional reconstruction techniques, greater sensitivity to emission counts is possible if the septa are removed. As the septa represent a significant cost, there is also an economic incentive to exclude them from the system. However, with the absence of septa, the problems of both detector dead-time and scatter are magnified.

Since the position of a source with respect to the detector system can be known, there is no need to detect coincidences, thereby allowing the use of a source that emits single gamma rays. Only one detector—the detector on the far side of the system—is needed to make the transmission or blank measurements. Without the counting losses due to the dead-time of the near detector, the activity of the source may be increased resulting in an increase in count-rate and thus a better quality measurement. However, without axial collimation, the scatter included in the transmission scan causes an underestimate of the attenuation measurement. To decrease the possibility of scatter, the gamma rays from the source can be collimated with lead or tungsten to form a beam that illuminates only a narrow plane of detectors. Other gamma rays that would only contribute to background are eliminated. Since the directionality of single gamma rays cannot be determined, only a single point of activity illuminating a detector bank can be used. This requires increased levels of activity to meet the count-rate needed for an adequate quality measurement. Also, the scanning protocol is more efficient if the transmission measurement is performed after the patient has been injected with radioactivity. Even though a different isotope such as $^{137}$Cs which emits gamma rays with an energy of 662 keV can be used for the transmission scan, there is significant difficulty in distinguishing the transmission events from the emission events.

Another tomographic diagnostic system that is similar to PET is known as single photon emission computed tomography (SPECT). The distinction is that in SPECT, only a single photon from a nuclear decay within the patient is detected. Also, the line of response traveled by the photon is determined exclusively by detector collimation in SPECT, as opposed to the coincident detection of two collinear photons as in PET.

In computed axial tomography (CAT, or now also referred to as CT), an external x-ray source is caused to be passed around a patient. Detectors around the patient then respond to x-ray transmission through the patient to produce an image of an area of study. Unlike PET and SPECT, which are emission tomography techniques because they rely on detecting radiation emitted from the patient, CT is a transmission tomography technique which utilizes only a radiation source external to the patient.

The details of carrying out a PET study are given in numerous publications. Typically, the following references provide a background for PET. These are incorporated herein by reference for any of their teachings.

1. M. E. Phelps et al.: "Positron Emission Tomography and Audiography", Raven Press, 1986;
2. R. D. Evans: "The Atomic Nucleus", Kreiger, 1955;
3. J. C. Moyers: "A High Performance Detector Electronics System for Positron Emission Tomography", Masters Thesis, University of Tenn., Knoxville, Tenn., 1990;
4. U.S. Pat. No. 4,743,764 issued to M. E. Casey, et al, on May 10, 1988;
5. R. A. DeKemp et al.: "Attenuation Correction in PET Using Single Photon Transmission Measurement", Med. Phys., vol. 21, 771-8, 1994;
6. S. R. Cherry et al.: "3-D PET Using a Conventional Multislice Tomograph Without Septa", Jl. C.A.T., 15(4) 655-668.
7. J. S. Karp et al.: "Singles Transmission in Volume-Imaging PET With a $^{137}$Cs Source", Phys. Med. Biol. Vol. 40, 929-944 (1995).
8. S. K. Yu et al.: "Single-Photon Transmission Measurements in Positron Tomography Using $^{137}$Cs", Phys. Med. Biol. Vol. 40, 1255-1266 (1995).
9. G. F. Knoll: *Radiation Detection and Measurement*, John Wiley & Sons (1989).
10. S. R. Cherry et al.: "Optical Fiber Readout of Scintillator Arrays using a Multi-Channel PMT: A High Resolution PET Detector for Animal Imaging", IEEE Transactions on Nuclear Science, Vol. 43, No. 3, 1932-1937 (June, 1996).
11. J. A. McIntyre et al.: "Construction of a Positron Emission Tomograph with 2.4 mm Detectors", IEEE Transactions on Nuclear Science, Vol. 33, No. 1, 425-427 (February, 1986).

Both SPECT and CAT (or CT) systems are also well known to persons skilled in the art.

In order to achieve maximal quantitative measurement accuracy in tomography applications, an attenuation correction must be applied to the collected emission data. In a PET system, for example, this attenuation is dependent on both the total distance the two gamma rays must travel before striking the detector, and the density of the attenuating media in the path of travel. Depending on the location of the line of response within the patient's body, large variations in attenuating media cross section and density have to be traversed. If not corrected, this attenuation causes unwanted spatial variations in the images that degrade the desired accuracy. As an example, for a cardiac study the attenuation is highest in the line of responses (LORs) passing through the width of the torso and arms, and attenuation is lowest in the LORs passing through from the front to the back of the chest.

Typically, the attenuation correction data in PET systems is produced by either: shape fitting and linear calculations using known attenuation constants, these being applicable to symmetric well-defined shapes such as the head and torso below the thorax (calculated attenuation); or through the measurement of the annihilation photon path's attenuation using a separate transmission scan (measured attenuation). The use of calculated attenuation correction, which introduces no statistical noise into the emission data, can be automated for simple geometries such as the head, and is the most prominent method used for brain studies. However, complexities in the attenuation media geometry within the chest have prevented the application of calculated attenuation from being practical for studies within this region of the body. Accordingly, transmission scanning has been utilized.

The total attenuation of a beam along an LOR through an object is equal to the attenuation that occurs for the two photons from an annihilation. Thus, the emission attenuation along the path can be measured by placing a source of gamma rays on the LOR outside of the body and measuring attenuation through the body along this line. It has been the practice to accomplish this attenuation measurement by placing a cylindrical positron emitter "sheet" within the PET tomograph's field of view (FOV) but outside of the region (the object) to be measured. The ratio of an already acquired blank scan, where no object is placed in the FOV, to the acquired transmission scan is calculated. These data represent the desired measured attenuation factors, which may vary spatially. These data are then applied to the emission data after a transmission scan of the object to correct for the spatial variations in attenuation.

There are two types of transmitter source units conventionally utilized in PET transmission scan data collection, both of which form a "sheet" of activity to surround the patient. These approaches include rotating dual photon rod sources ($^{68}$Ge/Ga) with windowing and spiraling single photon point sources ($^{137}$Cs) with collimation.

Rods with windowing are the most widely implemented mechanism for transmission measurements in PET. Advantages include noise rejection, physical simplicity (detectors optimized for emission event detection are also conscripted for transmission detection), and operational simplicity. L. R. Carroll et al., "The orbiting rod source: improving performance . . . ," *Em. Com. Tom.:Current Trends, Soc. Of Nucl. Med.*, 1983, disclose windowing or masking for noise rejection. Operational simplicity is illustrated by S. R. Meikle et al., "Simultaneous emission and transmission measurements . . . ," *J. Nucl. Med.*, vol. 26, 1680–1688, 1995, who disclose the use of rods with windowing for simultaneous emission/transmission (SET) acquisitions.

A principal disadvantage of implementing rods with windowing for transmission measurements in PET is the high counting losses of the detectors nearest the rods. Typical of these detectors are: block decoding, as developed by M. E. Casey et al., "A multicrystal two dimensional BGO detector . . . ," *IEEE Trans. Nu. Sc.*, vol. 33, 460–463, 1986, in which photon scintillation by a single crystal affects counting losses of 31 or more nearby crystals; and electronic gated integration which also is a significant contributor to pulse processing time, which increases the likelihood of pileup. These two common features of current PET detectors, essential for emission photon detection, generate significantly high counting losses for detectors of photons nearest the transmission sources, or the near detectors, resulting in low counting statistics for practical duration transmission scans. Maximum noise equivalent rates for rod windowing of approximately 100 k events/sec are reported by W. F. Jones et al., "Optimizing rod window width . . . ," *IEEE Trans. Med. Im.*, vol. 14, 266–270, 1995.

As reported by R. A. DeKemp et al., single photon designs have been explored for overcoming the statistical limitations of dual photon rods. With no near detector, single photon offers an order of magnitude increase in gross transmission count rates. As reported by W. Jones et al., "The architectural impact of single photon . . . ," *IEEE Nucl. Sci. Symp. Conf. Rec.*, 1026–1030, 1995, gross counts of several million events/sec are achievable. Unfortunately, high scatter fraction limits noise equivalent counts as reported by D. L. Bailey et al., "Strategies for accurate . . . ," *IEEE Nucl. Sci. Symp. Conf. Rec.*, 1997. While physical collimation reduces scatter content as disclosed by D. L. Bailey et al., "A spiral CT approach . . . ," *J. Nucl. Med.*, vol. 38, p. 113P (Abstract), 1997, the potential benefits from single photon are now viewed less optimistically. In the ART example reported by C. C. Watson et al., "Design and performance of single photon . . . ," *IEEE Nucl. Sci. Symp. Conf. Rec.*, 1997, collimated single photon blank scan count rates are limited to 600 k to 2 M events/sec. Also for single photon design, innovative techniques make post-injection acquisitions practical and effective, but true SET remains less practical.

The ring source method significantly reduces the sensitivity of the tomograph due to the close source-proximity dead time effects of the source activity on all of the detectors. Further, removal of this assembly is either performed manually by facility personnel or by a complex automated mechanical assembly. Large, cumbersome, out of the FOV shielding is required for storage of the automated source when not in use, adding to the depth of the tomograph tunnel and, thus increasing incidence of patient claustrophobia. The second type of emitter, using rotating source(s) suffers from the above-mentioned problems and also, due to the shielding requirements, reduces the patient tunnel diameter, further increasing patient claustrophobia symptoms.

Both of the above automated source transportation methods suffer from high mechanical component cost and from low sensitivity. Due to the dead-time-induced reduction in tomograph sensitivity, lengthy acquisitions are required in order to achieve usable low noise transmission scan data.

In order to reduce costs in scintillator detector applications, multiplexing techniques based on the use of fiber optics are advantageous. Those disclosures made by Cherry et al. (Cherry), and McIntyre et al. (McIntyre), teach the use of fiber optics connected between the imaging detectors and multichannel photomultipliers (PMT's). Cherry discloses the use of a multi-channel PMT in association with an 8×8 array of bismuth germanate (BGO) crystals. As discussed by Cherry, a charge division readout board is used to convert the 64 signals into four position sensitive signals which determine the crystal interaction. In the earlier McIntyre article, the authors disclose the use of fiber optics coupled between the detectors and a number of multi-channel PMT's. Specifically, McIntyre teaches the use of 288 PMT's in association with 8,192 detectors, for reducing the number of required PMT's by a factor of about 28.4.

In the McIntyre embodiment, eight detector rings are each divided into four quadrants. Each ring is comprised of sixteen concentric rings. The respective quadrants for the eight detector rings are grouped together for a total of 256 detectors per quadrant group. Sixteen "coarse" fiber sets connect sixteen PMT's to the 256 detectors, with sixteen detectors in one ring quadrant connected to one PMT. Similarly, sixteen "fine" fiber sets connect sixteen PMT's to the 256 detectors, with corresponding detectors in each ring quadrant of a quadrant group being connected to one PMT. One PMT is connected to each ring quadrant. Thus, a total of 32 PMT's are required for determining the particular detector "Θ" address within a quadrant. Similarly, 32 PMTs are required to determine the "r" address, corresponding to which of the concentric rings in a particular ring the detector is disposed. Finally, eight PMTs are required to determine in which ring quadrant the detector is disposed. Thus, a total of 72 PMTs are required for each quadrant for a total of 288 PMTs in association with 8,192 detectors.

BRIEF SUMMARY OF THE INVENTION

The present invention serves to detect coincident activity from a collimated point source. The present invention includes a detector dedicated to collecting attenuation data. The collimated point source and dedicated detector are positioned with respect to the tomography device such that only a selected strip of the imaging detector is illuminated such that events unrelated to the attenuation are eliminated. Fiber-optic encoding of the gamma radiation detectors is provided to minimize the required number of PMT's.

The source of the present invention includes a collimator in which is disposed a point source. An opening is defined by the collimator for exposing a selected portion of the imaging detectors of the tomograph device. Positioned behind the point source, relative to the imaging detectors, is an attenuation detector dedicated to collecting attenuation data. Because the attenuation detector is dedicated to the attenuation measurement, the requirements for the attenuation detector are different from those for the imaging detector. For instance, it is not required that the attenuation detector be able to accurately determine the energy or spatial position of events within the detector, as is necessary for standard imaging detectors. It is therefore possible to design such an attenuation detector with much less dead time, and much higher count rate performance, than a standard imaging detector. The improved count rate performance of the attenuation detector enables significant reduction of statistical noise in the attenuation correction measurement. The attenuation detector and collimator are designed to illuminate only a strip of the imaging detector, and the corresponding aperture of the attenuation detector, thereby eliminating events not of interest in the attenuation measurement. This also reduces dead time of the system and improves the count rate performance for events of interest.

A source of the present invention is disposed opposite each bank of imaging detectors of a dual head camera. Each source contains four point sources arranged along the axial extent. The sources and the associated collimators are positioned to the side of each head at a slight angle relative to the respective head. The sources and detectors are fixed relative to the imaging heads. In order to obtain full coverage of the field of view (FOV) in the same manner as for an emission scan, the heads and sources are rotated about the center of the camera. In one embodiment, a two-dimensional array of detectors is associated with each head. The detectors are grouped in threes, with the first of each group being aligned, the second of each group being aligned with each other and transaxially positioned relative to the first, and the third of each group being aligned with each other and transaxially positioned relative to the first and second. This disposition of the detectors substantially reduces crosstalk between successive pairs.

The present invention further provides an arrangement of fiber optics interconnected between a plurality of dedicated gamma radiation detectors and a lesser number of photomultiplier tubes. The gamma radiation detectors are each provided for dedicated detection of 511 keV gamma radiation from one of a plurality of point sources disposed in a collimator. The arrangement of fiber optics is designed such that the address of a particular gamma radiation detector is readily discernable while minimizing the number of PMT's required to process data accumulated by the gamma radiation detectors.

In one embodiment, the attenuation point sources are disposed in a two-dimensional array having three rows, thus yielding three FOV fans defined between the transmission sources and the planar detector arrays. By moving neighboring source/crystal pairs transaxially, sufficient lead and distance is added to effectively minimize gamma crosstalk.

BRIEF DESCRIPTION OF THE SEVERAL VIEWS OF THE DRAWINGS

The above-mentioned features of the invention will become more clearly understood from the following detailed description of the invention read together with the drawings in which:

FIG. 11 illustrates the two-dimensional attenuation point source array of FIG. 7; and FIG. 12 illustrates, in section, a side view of one attenuation point source of FIG. 7.

DETAILED DESCRIPTION OF THE INVENTION

Figure 2:
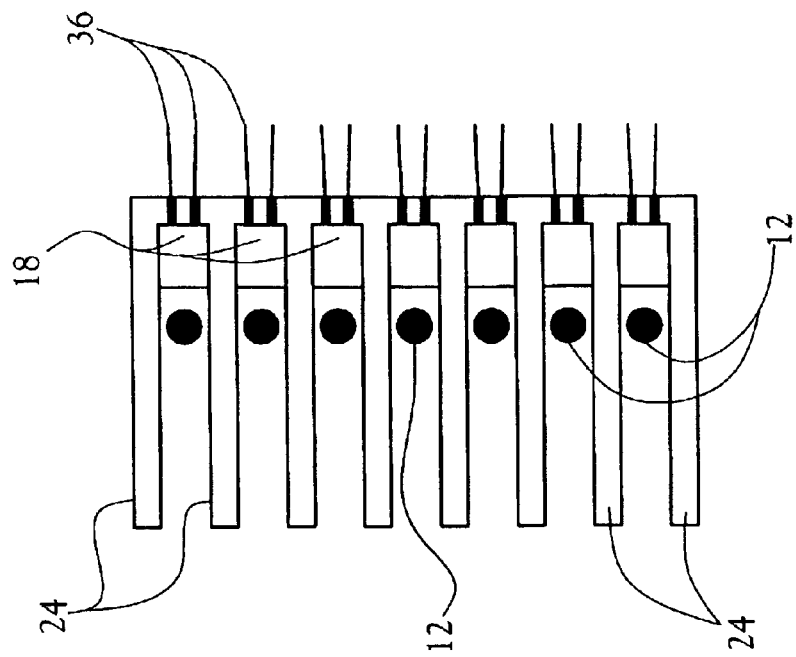
FIG. 2 illustrates an enlarged portion of a collimator showing an arrangement between a plurality of point sources, a similar plurality of dedicated gamma radiation detectors, and corresponding pairs of fiber optic cables.

A coincidence transmission source incorporating various features of the present invention is illustrated generally at 10 in the figures. The coincidence transmission source, or device 10, is designed for collimating and detecting coincident activity from a source 12 of radiation such as the point source 12 illustrated in FIG. 12. Moreover, the device 10 of the present invention includes a detector 18 dedicated to collecting attenuation data. The collimated point source 12 and dedicated attenuation detector 18 are positioned with respect to the tomography device 22 such that only a selected strip of the imaging detector 14 is illuminated such that events unrelated to the attenuation are eliminated. The imaging detector 14 may be comprised of either a plurality of imaging detectors 14 or a single continuous imaging detector 14 having spatial positioning capabilities. Each of the collimated point sources 12 is fiber-optically connected to at least one photomultiplier tube (PMT) 38 in order to decrease the amount of PMTs 38 required for operation of the tomography device 22.

As will be discussed throughout, many variations of the apparatus used in association with the method of the present invention may be adapted to fit various conventional applications of tomography. For example, the device 10 of the present invention may be adapted to various conventions of PET, SPECT, and other tomography applications or combinations thereof. The radiation source 12 may define various configurations, as will be discussed below, as required. Further, the radiation source 12 may be maintained stationary with respect to either or both of the dedicated attenuation detector 18 and the imaging detector 14, or may be moved to various positions within the tomograph device for individually collecting attenuation data corresponding to more than one imaging detector 14. In the latter case, the path in which the radiation source 12 is moved may be in any conventional path, or any path yet to be employed.

Again referring to FIG. 12, the device 10 of the present invention includes a collimator 24 in which is disposed a point source 12. An opening 26 is defined by the collimator 24 for exposing a selected portion of the imaging detectors 14 of the tomography device 22. To this extent, the opening 26 defines a top and a bottom shield wall 28,30, with the top shield wall 28 extending from the point source 12 toward the far detector 44 of the imaging detectors 14 opposite the device 10, and the bottom shield wall 30 extending toward the near detector 46 of the imaging detectors 14. Side shield walls 32 are defined to limit the width of the collimated radiation beam. Positioned behind the point source 12, relative to the imaging detectors 14, is an attenuation detector 18 dedicated to collecting attenuation data.

Because the attenuation detector 18 is dedicated to the attenuation measurement, the requirements for the attenuation detector 18 are different from those for the imaging detectors 14. The attenuation detector 18 of the preferred embodiment consists of a single crystal of dense, fast material such as Lutetium Oxyorthosilicate (LSO) coupled to a single photomultiplier 38. However, it will be understood that other scintillator materials may be used as the material of manufacture of the attenuation detector 18 as required. Because the attenuation detector 18 is provided only for detecting events from the point source 12, good energy resolution is not of great importance. Further, because the attenuation detector 18 is positioned proximate the point source 12, the attenuation detector 18 is selected to exhibit low dead-time losses. The attenuation detector 18 and collimator 24 are designed to illuminate only a strip of the imaging detector 14, thereby eliminating events not of interest in the attenuation measurement. As a result of the coincident measurement allowing for electronic collimation, attenuation measurements may be made in the presence of other radiation such as that from a pre-injected patient. Further, the electronic collimation allows for the use of multiple point sources 12, thereby reducing the activity requirements on a single source 12.

Figure 1:
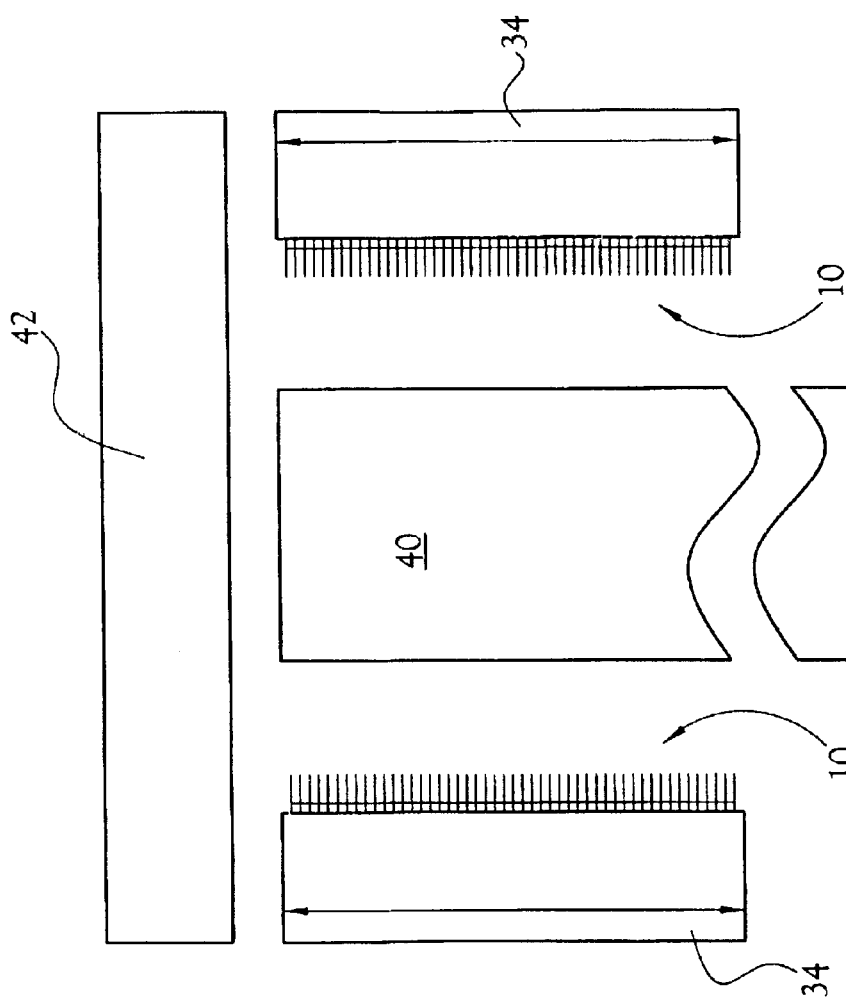
FIG. 1 illustrates a top plan view of a dual head tomograph incorporating two banks of collimated point sources made in accordance with several features of the present invention.

FIG. 1 illustrates the top plan view of a dual head tomograph 22 device having two banks of collimated point sources 12 positioned in reference to a patient bed 40 and a gantry 42. In this embodiment, the point sources 12 are disposed linearly with respect to each other point source 12. FIG. 2 is an enlarged view of a portion of one bank of the collimated point sources 12. One point source 12 is disposed between successive pairs of collimators 24 and immediately in front of one dedicated gamma radiation detector 18. However, it will be understood by those skilled in the art that a single rod source 12 of radiation may extend behind or through the collimators 24 and thus successfully serve as the plurality of point sources 12 of this embodiment. Two groups of fiber optic cables 36 are connected at a proximal end to each detector 18, with the exception of a few detectors 18 to be described below which only have one fiber optic cable 36 connected thereto. The distal end of each fiber optic cable 36 is connected to an optical detector such as a PMT 38, as more clearly illustrated in FIG. 3.

Figure 3:
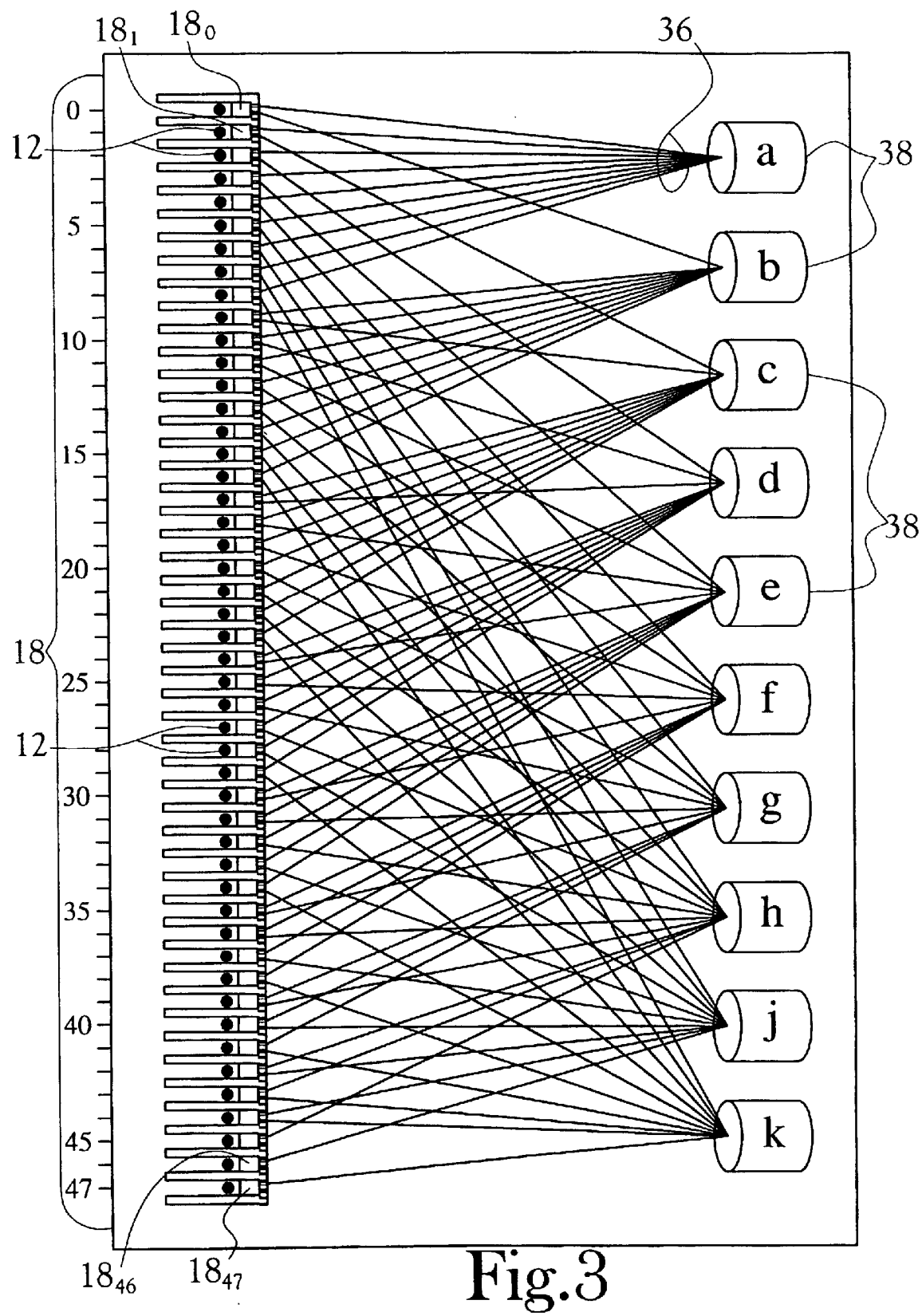
FIG. 3 is a schematic diagram representing a portion of the fiber optic connections between the dedicated gamma radiation detectors and the photomultiplier tubes.

Illustrated in FIG. 3 are 48 detectors $18_{0-47}$, interconnected to ten (10) PMTs 38a–k. The fiber optic cables 36 interconnected between the detectors $18_{0-47}$ and the PMT's 38a–k are arranged such that no two fiber optic cables 36 are connected between the same detector 18 and the same PMT 38. Using the convention described above, Table 1 below more clearly illustrates the fiber optic connections.

TABLE 1

|   | b | c | d | e | f | g | h | j | k |
|---|---|---|---|---|---|---|---|---|---|
| a | 0 | 1 | 2 | 3 | 4 | 5 | 6 | 7 | 8 |
| b |   | 9 | 10 | 11 | 12 | 13 | 14 | 15 | 16 |
| c |   |   | 17 | 18 | 19 | 20 | 21 | 22 | 23 |
| d |   |   |   | 24 | 25 | 26 | 27 | 28 | 29 |
| e |   |   |   |   | 30 | 31 | 32 | 33 | 34 |
| f |   |   |   |   |   | 35 | 36 | 37 | 38 |
| g |   |   |   |   |   |   | 39 | 40 | 41 |
| h |   |   |   |   |   |   |   | 42 | 43 |
| j |   |   |   |   |   |   |   |   | 44 |
|   |   |   |   |   |   |   |   | 45 | 46 | 47 |

In this table, a through k are the PMT 38 labels and 0 through 47 are the detector 18 labels. It will be seen from the FIG. 7 and from the above table that PMT's 38a–g are optically coupled with nine (9) detectors 18 each while PMT's 38h, 38j and 38k are optically coupled with ten (10) detectors 18 each. Further, it will be seen that detectors $18_{0-44}$ are optically coupled with two (2) PMTs 38 each, while detectors $18_{45-47}$ are optically coupled with one (1) PMT 38 each. Of course, it will be understood that other configurations may be adopted as well and with similar results. Coincidence detection of pulse output from unique pairs of PMT's 38, or a single detection in PMT's 38h, 38j or 38k, determines which detector 18 received the near-side gamma radiation from its respective point source 12. The lengths of each optical fiber 36 in a fiber optic pair are equal in order to ensure that pulse output at the corresponding PMT's 38 is simultaneous.

In one application of the method of the present invention, a dual photon point source 12 array with fast-channel, near detectors using transmission measurement is implemented in a dual-head rotating positron emission tomograph 22. An array of twenty-one collimated $^{68}$Ge/Ga point sources 12 is carried by each head 34. Each array is aligned axially to orbit the FOV 16. A near detector 18 is dedicated to each source 12. The near detector 18 is an LSO scintillator. The detectors 18 are fiber-optically coupled to PMTs 38. As the detectors 18 are not block encoded, pulse-processing time is reduced, thereby reducing dead time and permitting hotter sources. A larger array, such as 21 point sources 12 per head 34, is used to improve axial sampling. To reduce cost, detectors 18 are fiber-optically coupled into unique PMT 38 pairs, thereby decreasing the total number of near-detector PMTs 38 from 42 to 12, which is a reduction of seventy-one percent (71%).

In this application, arrays of transmission sources 12, which are dual photon $^{68}$Ge/Ga point sources 12 with dedicated, fast-channel LSO detectors 18, orbit the FOV 16. Compared to single photon approaches, transmission count rates are increased with less impact on SET. As each dedicated LSO detector 18 is placed near a point source 12 and isolated by collimation, almost all near-detector photons have a known origin, which is the point source 12, thereby reducing the need for more precise energy discrimination and longer pulse shaping times. Also, with as few as 7 to 42 detector crystals 18 required per tomograph versus 20,000 crystals required for emission detection, traditional block decoding, which requires long shaping times and thus increases pileup, is eliminated. In the present invention, pulse processing for LSO is reduced from a nominal (for BGO) 315 ns to 120 ns. Also without block decoding, scintillation in one crystal 18 affects dead time for few or no nearby crystals 18.

One implementation of transmission source/detector arrays is for the E.CAT manufactured by CTI/Siemens in Knoxville, Tenn. The E.CAT is a dual-head rotating tomograph 22 for generating images in both SPECT and PET modalities. In an alternate of this embodiment, each of the two planar detector heads 34 includes a NaI/LSO crystal matrix. However, as opposed to the description of the previous embodiment, a set of three $^{68}$Ge/Ga point sources 12 are paired with three respective LSO detectors 18 and employed relative to one head 34. The other head 34 is deployed with four pairs of $^{68}$Ge/Ga point sources 12 and LSO detectors 18, for a total of seven pairs for the tomograph 22. The seven point sources 12 are spaced relative to each other such that when rotated, each lies in a separate parallel plane, the seven planes being evenly spaced apart. As the planar arrays are implemented with multiple crystal blocks, seven "columns" of blocks traverse the axial extent for each planar array. The initial choice for seven sources 12 is made so that each of the seven block column pairs is axially aligned with a dedicated transmission source.

For a typical EXACT HR⁺, rotating rods with septa removed produce near-detector counting losses of greater than thirty percent (>30%). An LSO detector channel with 120 ns pulse processing time that is allowed only a 10% counting loss counts up to 0.9 M/sec. By holding this same 10% loss rate in each of the illustrated seven near detectors, gross near-detector count rates of 6 M/sec per tomograph are useable for non-SET and, when adequate throughput is provided, in downstream coincidence and acquisition processing. Such improved count rate performance allows the use of hotter transmission sources, reduces scan time, and lowers image noise.

In the case of rod windowing, transmission line-of-response, LOR, sampling of the FOV 16 matches that of the emission acquisition as a result of using the same detectors for both. Applying measured attenuation correction to the emission projection space typically requires no LOR rebinning. As dedicated source/LSO arrays are developed for more effective transmission measurement, mapping the attenuation correction for application to the emission projection space becomes essential.

Figure 4:
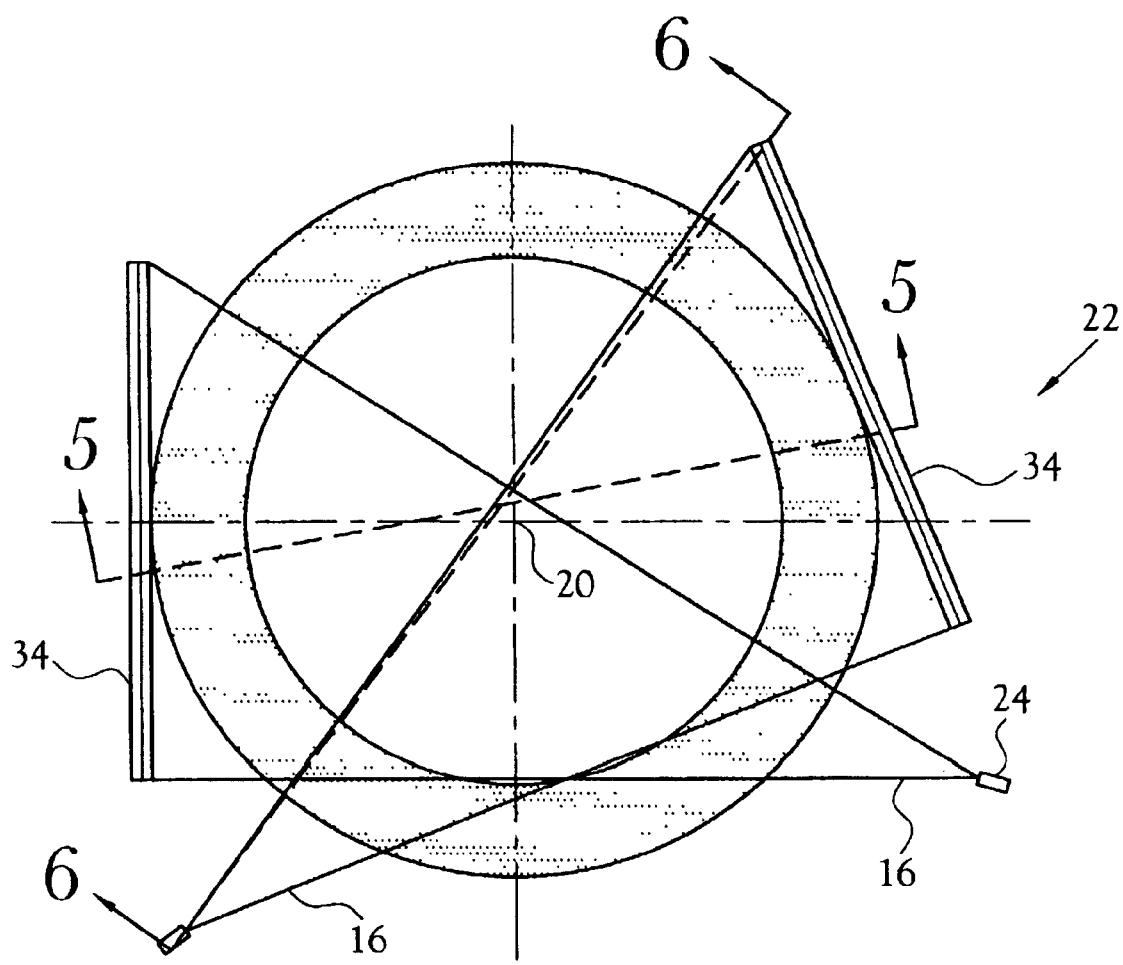
FIG. 4 illustrates an end view of a dual head tomograph showing the relative locations of the two planar detector arrays and the attenuation point sources.
Figures 5, 5A:
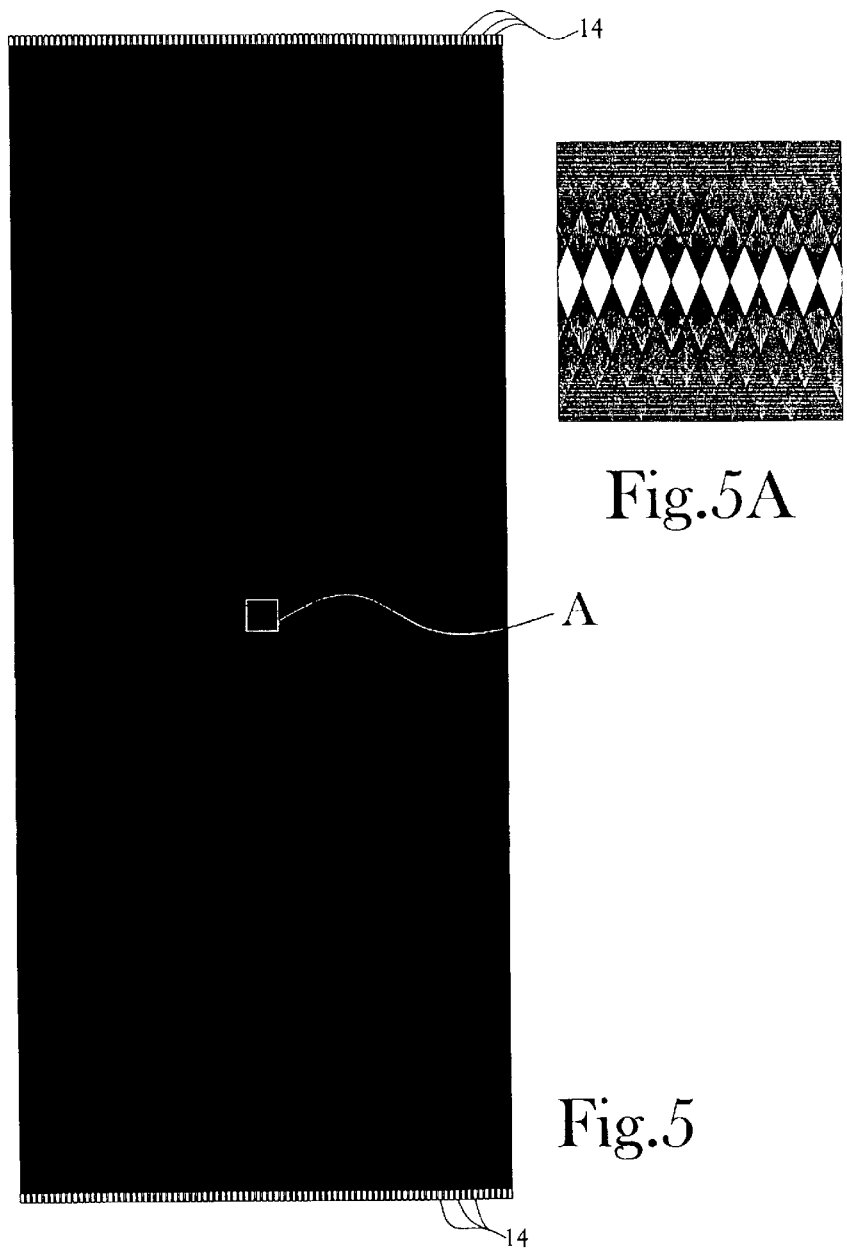
FIG. 5 illustrates axial sampling achieved by the tomograph device of FIG. 4 in emission mode, taken along section lines 5—5 of FIG. 4.
FIG. 5A is an enlarged view of a portion of the LOR intersecting the FOV at A in FIG. 5.

FIG. 4 illustrates an end view of the E.CAT 22 showing the relative locations of the two planar detector 14 arrays and the attenuation point sources 12. FIG. 5 represents the quality of axial sampling achieved by the E.CAT 22 in emission mode. FIG. 5A is a scale depiction of LOR intersecting the FOV 16 between the two planar detector 14 arrays along Section 5—5 of FIG. 4. In FIG. 5A, each emission LOR intersecting Section 5—5 is illustrated, the collective LORs being dense. The maximum ring difference between the LORs is 71. While the two-dimensional transaxial emission planes, or segment 0 sinograms, typically only have LOR contributions from a maximum ring difference of 4 to 6, LOR having a maximum ring difference of 71 are illustrated in order to more clearly highlight the limit of axial sampling at the center of the FOV 16 for emission LOR.

Figures 6, 6A:
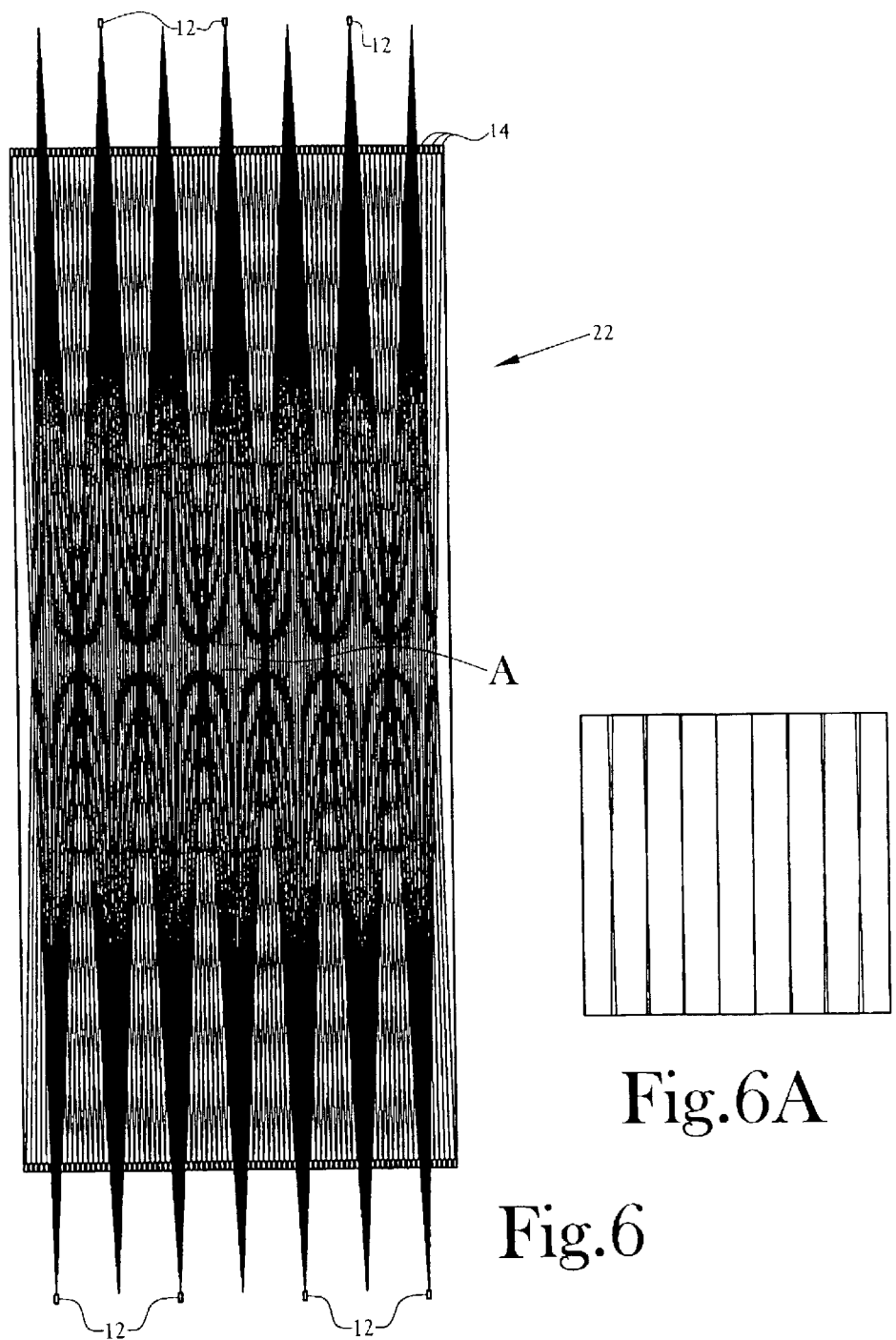
FIG. 6 illustrated axial sampling achieved by the tomograph device of FIG. 5 using a 7-source transmission system, taken along section lines 6—6 of FIG. 4.
FIG. 6A is an enlarged view of a portion of the LOR intersecting the FOV at A in FIG. 6.

FIG. 6 represents the quality of axial sampling achieved with the E.CAT 22 using the initial 7-source transmission system described above. FIG. 10A illustrates transmission LOR intersecting the FOV 16 through Section 6—6 of FIG. 4. Each transmission LOR intersecting Section 6—6 after a 360 degree rotation is illustrated. The LOR, as illustrated, are define a maximum ring difference of 12. The performance restrictions resulting from the 7-source system are illustrated in that while the 7-source design choice is a good, economical start, analysis suggests several shortcomings. First, the axial FOV transmission length is 1.8 cm shorter than the embodiment illustrated in FIG. 5. Second, for the illustrated embodiment and as compiled in Table 2 below, the two-dimensional transaxial plane transmission axial sampling of 0.27 cm on the FOV axis is inadequate to cover the emission sampling of 0.22 cm. Third, because of the inadequate sampling, the 7-source system must apply a ring difference of 12 (a span of 32) to the transaxial planes. As the ring difference is decreased, the axial sampling results become less acceptable.

Figure 7:
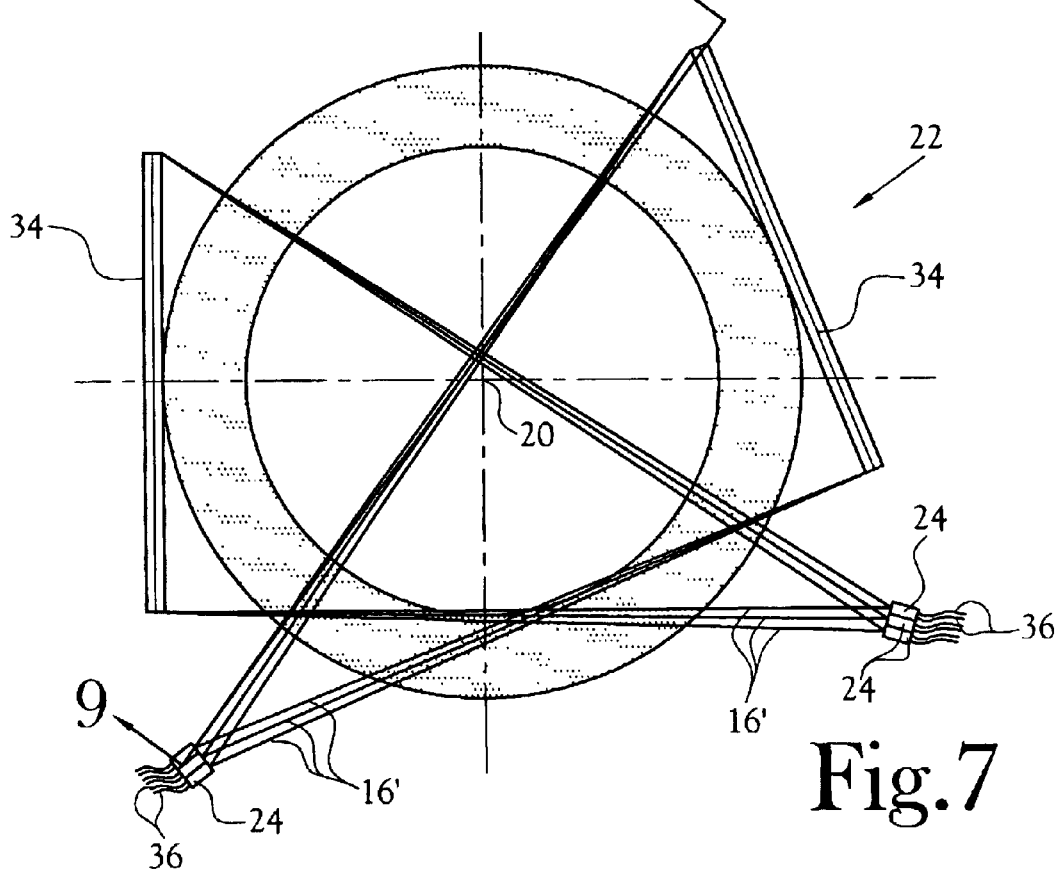
FIG. 7 illustrates an end view of the dual head tomograph showing the relative locations of the two planar detector arrays and the attenuation point sources, the attenuation point sources being disposed in a two-dimensional array to define a plurality of FOV fans.

FIG. 7 illustrates a device 10 disposed opposite each bank of imaging detectors 14 of a dual head camera 22. In this embodiment, each device 10 contains twenty-one point sources 12 (see FIG. 12) arranged along the axial extent. The sources 12 and the associated collimators 24 are positioned to the side of each head 34. As illustrated, the sources 12 and detectors are fixed relative to the imaging heads 34. In order to obtain full coverage of the FOV 16 in the same manner as for an emission scan, the heads and sources 12 are rotated about the center point 20.

Figure 8:
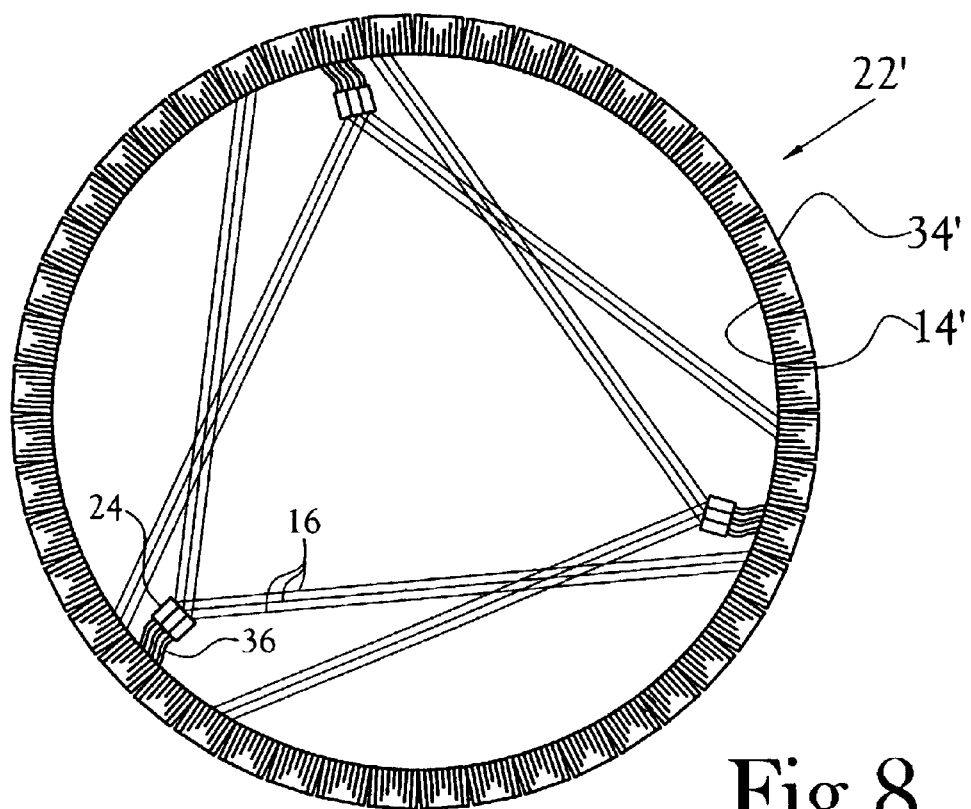
FIG. 8 illustrates an end elevation view, in section, of the coincidence transmission source of the present invention showing the point source and detector positioned within a full ring detector.

As illustrated in FIG. 8, the device 10 of FIG. 7 may also be used in association with a full-ring tomograph 22'. In this environment, the device 10 is disposed between the imaging detector ring 34' and the patient opening 35 so as not in interfere with the placement of the patient. In this embodiment, the device 10 is movable within the tomograph 22' in a conventional manner in order to collect attenuation data from each of the plurality of imaging detectors 14'.

Figures 9, 9A:
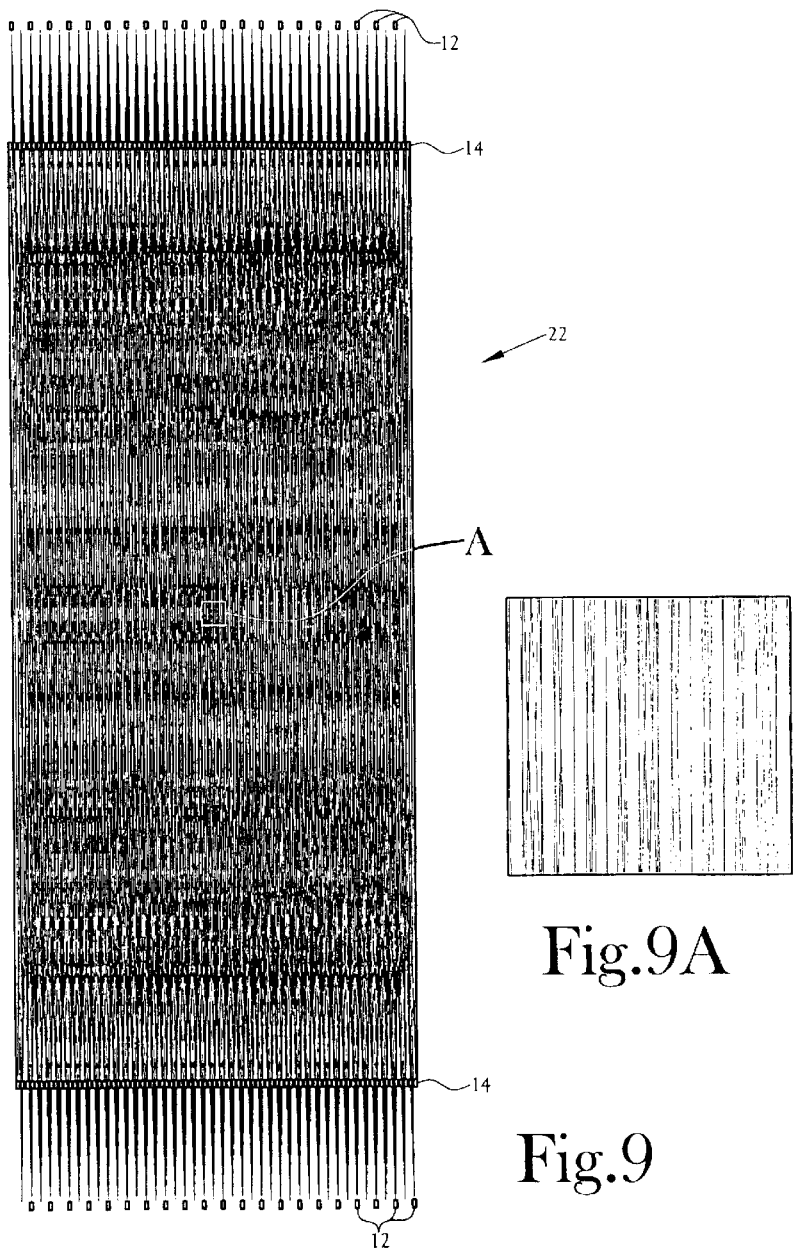
FIG. 9 illustrates axial sampling achieved with the tomograph device of FIG. 7 using a 42-source transmission system, taken along section lines 9—9 of FIG. 7.
FIG. 9A is an enlarged view of a portion of the LOR intersecting the FOV at A in FIG. 9.

FIG. 7 illustrates an end view of the E.CAT 22 showing the relative locations of the two planar detector 14 arrays and the attenuation point sources 12. In this embodiment, the attenuation point sources 12 are disposed in a two-dimensional array having three rows, thus yielding three FOV fans 16' defined between the transmission sources and the planar detector 14 arrays. FIG. 9 illustrates the axial sampling achieved with the E.CAT 22 using a 42-source 12 transmission system. FIG. 9A is a scale depiction of transmission LOR intersecting the FOV 16' through Section 9—9. Each transmission LOR intersecting Section 9—9 is illustrated after a 360 degree rotation. The LORs have a maximum ring difference of 6. As compared to the 7-source transmission system, the 42-source transmission system supports a longer transmission FOV length so that the available emission axial FOV length need not be compromised by the lack of measured attenuation correction. By incorporating 42 sources 12, much more adequate axial sampling along a two-dimensional transaxial plane is accomplished. Also with the 42-source system, this very adequate axial sampling comes without large compromising choices for transaxially (segment 0) applied maximum ring difference. Further, the 42-source approach does not restrict maximum ring difference. This restriction lies primarily with the collimator design choice and not with too few LOR. With the 42-source system, for example, oblique non-transaxial planes may be uncompromisingly serviced by LOR ring differences from 7 to 12 LOR.

Table 2 is a comparison of the 9 axial sampling parameters from axial sampling in PET emission mode, with a 7-source transmission system, and with a 42-source transmission system. As previously stated, the 7-source transmission system restricts the length of the FOV 16 along the FOV axis by 1.8 cm as compared to the emission FOV length. More favorably, the 42-source system only restricts the FOV length by 0.1 cm.

TABLE 2

|  | FOV Length | Axial Sampling at Axis | LOR Misalignment at FOV Edge |
| --- | --- | --- | --- |
| Emission | 36.9 | 0.22 | 0.63 |
| 7-Source Transmission | 35.1 | 0.27 | 1.4 |
| 42-Source Transmission | 36.8 | 0.12 | 0.63 |

With respect to the axial sampling at the axis, the two-dimensional transaxial plane sampling (segment 0) resolution along the FOV 16 is less effective for the seven-source 12 system as compared to the emission case by 22%. In an application in which the patient bed 40 is stationary, this under-sampling by the seven-source system results in the need for interpolation to fill unsampled attenuation correction planes. In contrast, the 42-source system over-samples, thus resulting in the elimination of the need for plane filling through interpolation.

Finally, with respect to LOR misalignment at the edge of the FOV 16, an emission scan which applies to the transaxial planes a maximum ring difference of four, or a span of seven, results in the misalignment of LOR at the FOV edge by 0.63 cm. If the far oblique LOR, with a ring difference of 12, from the seven-source system are applied to two-dimensional transaxial planes, a misalignment of 1.4 cm results, which is more than twice the emission error. By comparison, the 42-source system matches the emission misalignment exactly, while only applying a maximum ring difference of six to the transaxial planes.

Figure 10:
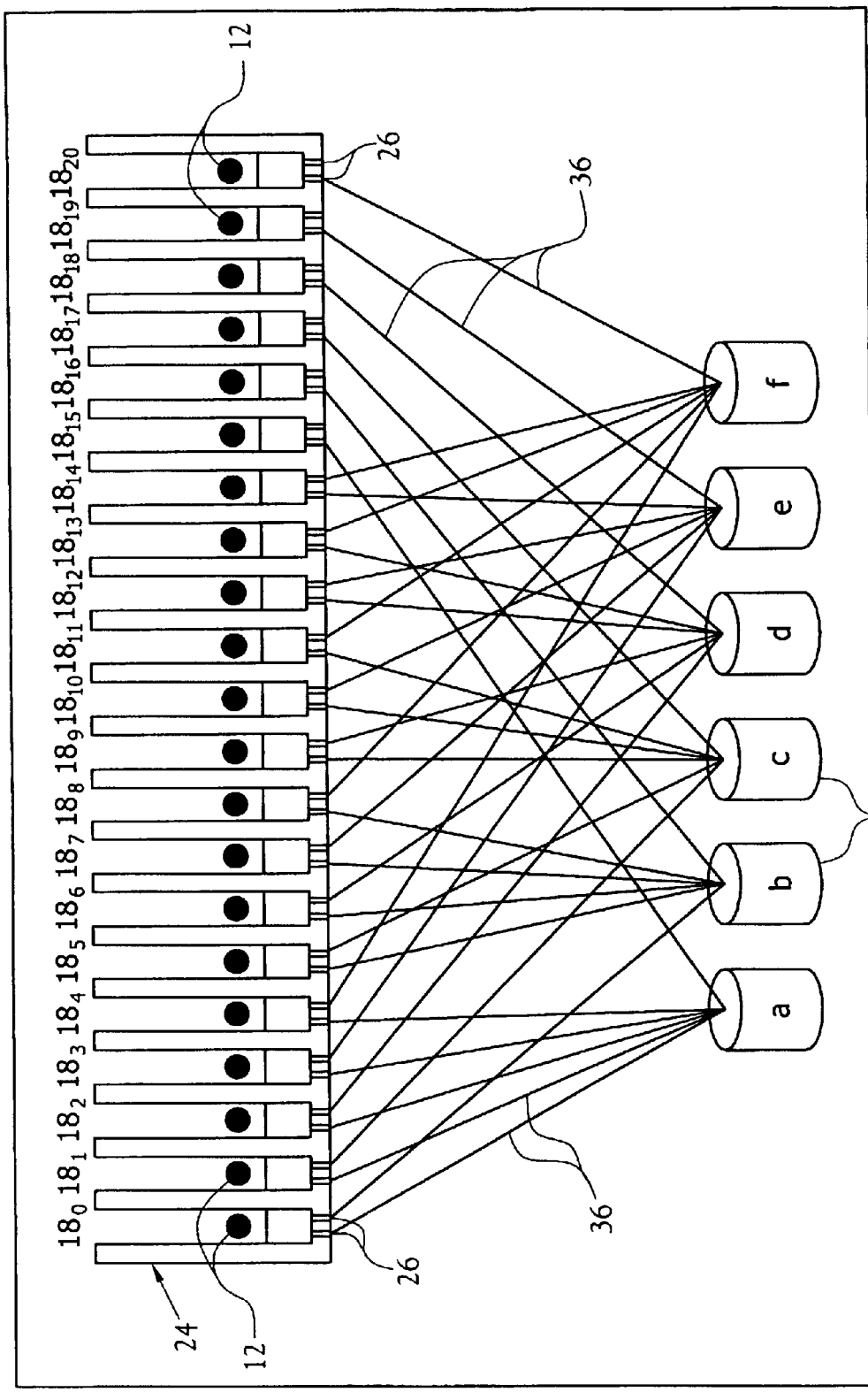
FIG. 10 is a schematic diagram representing the fiber optic connections between twenty-one dedicated gamma radiation detectors and six photomultiplier tubes.

One obstacle to delivering a 42-source system for the E.CAT is cost. If required, the cost of an additional 35 PMTs 38, as compared to the seven-source system described, to the E.CAT is prohibitive. In the present invention, fiber-optic encoding with LSO is used to reduce the additional PMT 38 count to five, for a total of twelve PMTs 38. FIG. 10 illustrates an encoding method for supporting 21 source 12/crystal 18 pairs with only six PMTs 38. This encoding method is similar to that illustrated in FIG. 3 and the associated Table 1. Twelve total PMTs 38 dedicated for 42-source transmission detection are less than twice those PMTs 38 required in the non-fiber-encoded and under-sampled 7-source system. Illustrated in FIG. 10 is an array of 21 $^{68}$Ge/Ga point sources 12 disposed in a row. A detector 18, such as an LSO crystal, is associated with each source 12, each LSO crystal 18 being isolated from other LSO crystals 18 using lead 24. Each crystal 18 is coupled fiber-optically with either one or two PMTs 38, with a total of six PMTs 38 provided. At least six crystals 18 supply scintillation light to each PMT 38. Crystals $18_{15-20}$ are each coupled to supply scintillation light to a single PMT 38$a$–$f$, respectively. Crystals $18_{0-14}$ are each coupled to a unique pair of two PMTs 38, the crystal 18 in scintillation being decoded from pulse coincidence between the corresponding unique pair of PMTs 38. Using the convention described above, Table 3 below more clearly illustrates the fiber optic 36 connections.

TABLE 3

|   | a | b | c | d | e | f |
|---|---|---|---|---|---|---|
| a |   | 0 | 1 | 2 | 3 | 4 |
| b |   |   | 5 | 6 | 7 | 8 |
| c |   |   |   | 9 | 10 | 11 |
| d |   |   |   |   | 12 | 13 |
| e |   |   |   |   |   | 14 |
| f | 15 | 16 | 17 | 18 | 19 | 20 |

One problem arising from the configuration of FIG. 10, as well as that of FIG. 2, is crosstalk, or noise between the individual point sources 12. Ideally, the vast majority of gamma arrival into each crystal 18 comes from the dedicated point source 12. If 21 sources 12 are equally distributed in a line along a 37 cm FOV length, insufficient shielding is typically available to prevent unacceptable gamma arrival at each crystal 18 from neighboring point sources 12. FIG. 11 illustrates a point source 12 arrangement for improving the gamma attenuation between crystals 18 and neighboring sources 12. In the illustrated embodiment, 21 source 12/crystal 18 pairs are deployed in a two-dimensional array consisting of three rows of seven. By moving the neighboring source 12/crystal 18 pairs transaxially, sufficient lead 24 and distance is added to effectively minimize gamma crosstalk. The lead collimation 24 and array configuration result in less than one percent (1%) of gammas detected due to crosstalk.

Illustrated in FIG. 11 are source 12/detector 18/collimator 24 elements arrayed in 7 groups of 3. One array is required for each head 34. In this view the FOV axis is horizontal. Groups of three, as shown, are interleaved from head to head resulting in a source aligned for every fourth crystal plane. FIG. 12 shows, in section, the side view of one source 12/detector 18/collimator 24 assembly. An opening 26 is defined in the bottom 30 for fiber 36 access to the detector 18.

From the foregoing description, it will be recognized by those skilled in the art that a coincidence transmission source offering advantages over the prior art has been provided. Specifically, the coincidence transmission source is provided for detecting coincident activity from a collimated point source. Moreover, the source of the present invention includes a detector dedicated to collecting attenuation data, thus changing the physical requirements of the attenuation detector as compared to an imaging detector and permitting it to be designed to achieve much lower dead time than a standard imaging detector. The collimated point source and dedicated detector are positioned with respect to the tomography device such the only a selected strip of the imaging detector is illuminated such that events unrelated to the attenuation are eliminated.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of the general inventive concept.

Having thus described the aforementioned invention, we claim:

1. A coincidence transmission source for accomplishing attenuation data collection relative to coincident activity from a radiation source associated with a tomograph device having at least one imaging detector positioned to define a field of view, said coincidence transmission source comprising:

a plurality of radiation point sources positioned with respect to the tomography device such that gamma radiation therefrom illuminates at least one imaging detector on the tomography device;

a plurality of collimators, each of said plurality of collimators receiving one of said plurality of radiation point sources and being positioned with respect to the tomography device such that a selected portion of the at least one imaging detector of the tomography device is illuminated by said radiation point source, thereby eliminating events unrelated to said attenuation data, said collimator defining an opening for exposing said radiation source to the selected portion of the at least one imaging detector of the tomograph device, said opening defining a top shield wall and a bottom shield wall, said top shield wall extending from said radiation source toward a far portion of the at least one imaging detector opposite said coincidence transmission source, said bottom shield wall extending toward a near portion of the at least one imaging detector opposite said coincidence transmission source, said opening further defining a pair of side shield walls spaced apart to limit a width of a collimated radiation beam emitted from said radiation source toward the selected portion of the at least one imaging detector;

a plurality of attenuation detectors, one each of said plurality of attenuation detectors being associated with one of said plurality of radiation point sources and one of said plurality of collimators for collecting attenuation data relative to said radiation point source in time coincidence with data collected by each imaging detector, said attenuation detector being independent from the at least one imaging detector; and a plurality of optical detectors, each of said plurality of attenuation detectors being optically coupled to at least one of said plurality of optical detectors, each of said plurality of optical detectors being optically coupled to a subset of said plurality of said attenuation detectors, said plurality of optical detectors being less than said plurality of attenuation detectors.

2. The coincidence transmission source of claim 1 wherein said plurality of collimators is disposed in a two-dimensional array to minimize gamma crosstalk between successive pairs of said plurality of radiation point sources.

3. The coincidence transmission source of claim 1 wherein each of said plurality of attenuation detectors is disposed behind said one of said plurality of radiation point sources within said one of said plurality of collimators relative to the tomography device imaging detector.

4. The coincidence transmission source of claim 1 wherein said attenuation detector is fabricated from a scintillation material which exhibits fast response times.

5. The coincidence transmission source of claim 4 wherein each of said plurality of attenuation detectors is fabricated from Lutetium Oxyorthosilicate (LSO) coupled to a single photomultiplier.

6. The coincidence transmission source of claim 1 wherein each of said plurality of attenuation detectors is selected to exhibit high sensitivity and low dead-time losses.

7. The coincidence transmission source of claim 1 being fixed relative to the imaging detector of the tomography device, said coincidence transmission source and the imaging detector being rotated about a center of the tomography device in order to obtain full coverage of the field of view (FOV) of the tomography device.

8. The coincidence transmission source of claim 1 adapted for use in a tomograph device including at least one imaging detector, said radiation source being movable within the tomograph device for collection of attenuation data relative to each of the at least one imaging detector.

9. A coincidence transmission source for accomplishing attenuation data collection relative to coincident activity from a radiation source associated with a tomograph device having at least one imaging detector positioned to define a field of view, said coincidence transmission source comprising:

a plurality of radiation point sources positioned with respect to the tomography device such that gamma radiation therefrom illuminates at least one imaging detector on the tomography device;

a plurality of collimators, each of said plurality of collimators receiving one of said plurality of radiation point sources and being positioned with respect to the tomography device such that a selected portion of the at least one imaging detector of the tomography device is illuminated by said radiation point source, thereby eliminating events unrelated to said attenuation data, said collimator defining an opening for exposing said radiation source to the selected portion of the at least one imaging detector of the tomograph device, said opening defining a top shield wall and a bottom shield wall, said top shield wall extending from said radiation source toward a far portion of the at least one imaging detector opposite said coincidence transmission source, said bottom shield wall extending toward a near portion of the at least one imaging detector opposite said coincidence transmission source, said opening further defining a pair of side shield walls spaced apart to limit a width of a collimated radiation beam emitted from said radiation source toward the selected portion of the at least one imaging detector, said plurality of collimators being disposed in a two-dimensional array to minimize gamma crosstalk between successive pairs of said plurality of radiation point sources;

a plurality of attenuation detectors, one each of said plurality of attenuation detectors being disposed behind one of said plurality of radiation point sources within one of said plurality of collimators for collecting attenuation data relative to said radiation point source in time coincidence with data collected by each imaging detector, said attenuation detector being independent from the at least one imaging detector; and a plurality of optical detectors, each of said plurality of attenuation detectors being optically coupled to at least one of said plurality of optical detectors, each of said plurality of optical detectors being optically coupled to a subset of said plurality of said attenuation detectors, said plurality of optical detectors being less than said plurality of attenuation detectors.

10. The coincidence transmission source of claim 9 being fixed relative to the imaging detector of the tomography device, said coincidence transmission source and the imaging detector being rotated about a center of the tomography device in order to obtain full coverage of the field of view (FOV) of the tomography device.

11. The coincidence transmission source of claim 9 adapted for use in a tomograph device including at least one imaging detector, said radiation source being movable within the tomograph device for collection of attenuation data relative to each of the at least one imaging detector.

12. A coincidence transmission source for accomplishing attenuation data collection relative to coincident activity from a radiation source associated with a tomograph device having at least one imaging detector positioned to define a field of view, said coincidence transmission source comprising:

a plurality of radiation point sources positioned with respect to the tomography device such that gamma radiation therefrom illuminates at least one imaging detector on the tomography device;

a plurality of collimators, each of said plurality of collimators receiving one of said plurality of radiation point sources and being positioned with respect to the tomography device such that a selected portion of the at least one imaging detector of the tomography device is illuminated by said radiation point source, thereby eliminating events unrelated to said attenuation data, said collimator defining an opening for exposing said radiation source to the selected portion of the at least one imaging detector of the tomograph device, said opening defining a top shield wall and a bottom shield wall, said top shield wall extending from said radiation source toward a far portion of the at least one imaging detector opposite said coincidence transmission source, said bottom shield wall extending toward a near portion of the at least one imaging detector opposite said coincidence transmission source, said opening further defining a pair of side shield walls spaced apart to limit a width of a collimated radiation beam emitted from said radiation source toward the selected portion of the at least one imaging detector, said plurality of collimators being disposed in a two-dimensional array to minimize gamma crosstalk between successive pairs of said plurality of radiation point sources;

a plurality of attenuation detectors, one each of said plurality of attenuation detectors encapsulating one of said plurality of radiation sources within one of said plurality of collimators, said attenuation detector being provided for detecting beta radiation emitted from said radiation source, said attenuation detector being independent from the at least one imaging detector; and a plurality of optical detectors, each of said plurality of attenuation detectors being optically coupled to at least one of said plurality of optical detectors, each of said plurality of optical detectors being optically coupled to a subset of said plurality of said attenuation detectors, said plurality of optical detectors being less than said plurality of attenuation detectors.

13. The coincidence transmission source of claim 12 being fixed relative to the imaging detector of the tomography device, said coincidence transmission source and the imaging detector being rotated about a center of the tomography device in order to obtain full coverage of the field of view (FOV) of the tomography device.

14. The coincidence transmission source of claim 12 adapted for use in a tomograph device including at least one imaging detector, said radiation source being movable within the tomograph device for collection of attenuation data relative to each of the at least one imaging detector.

* * * * *